US012703337B2

(12) United States Patent
Pech et al.

(10) Patent No.: US 12,703,337 B2
(45) Date of Patent: Aug. 11, 2026

(54) TRAILER BRAKE CONTROL

(71) Applicant: FCA US LLC, Auburn Hills, MI (US)

(72) Inventors: Esaias A Pech, Auburn Hills, MI (US); Emily A Robb, Auburn Hills, MI (US); Daniel P Cashen, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 78 days.

(21) Appl. No.: 18/820,605

(22) Filed: Aug. 30, 2024

(65) Prior Publication Data

US 2026/0061978 A1 Mar. 5, 2026

(51) Int. Cl.

*B60T 8/18* (2006.01)
*B60T 8/17* (2006.01)
*B60T 8/172* (2006.01)
*B60T 8/24* (2006.01)

(52) U.S. Cl.

CPC .......... *B60T 8/1887* (2013.01); *B60T 8/1708* (2013.01); *B60T 8/172* (2013.01); *B60T 8/1837* (2013.01); *B60T 8/1843* (2013.01); *B60T 8/185* (2013.01); *B60T 8/245* (2013.01); *B60T 2210/10* (2013.01); *B60T 2210/20* (2013.01); *B60T 2250/00* (2013.01); *B60T 2250/02* (2013.01)

(58) Field of Classification Search

CPC .................. B60T 8/1708; B60T 8/172; B60T 8/1837–185; B60T 8/1887; B60T 8/245; B60T 2210/10; B60T 2210/20; B60T 2250/00; B60T 2250/02

See application file for complete search history.

(56) References Cited

U.S. PATENT DOCUMENTS

| | | | | |
|---|---|---|---|---|
| 5,002,343 | A * | 3/1991 | Brearley | B60T 8/1708 188/3 R |
| 9,311,761 | B1 * | 4/2016 | Ye | B60W 40/00 |
| 9,440,627 | B2 * | 9/2016 | Kurtovic | B60T 8/171 |
| 9,558,409 | B2 * | 1/2017 | Pliefke | B60R 11/04 |
| 12,304,444 | B2 * | 5/2025 | Goodarzi | B60T 8/1887 |
| 2016/0114772 | A1 * | 4/2016 | Vietor | B60T 8/172 701/70 |

FOREIGN PATENT DOCUMENTS

WO WO-9416933 A1 * 8/1994 ............. B60D 1/248

OTHER PUBLICATIONS

Beckmann, WO 94/16933, machine translation. (Year: 1994).*

* cited by examiner

*Primary Examiner* — Mark L. Greene
(74) *Attorney, Agent, or Firm* — Jeremy J. Klobucar

(57) ABSTRACT

A method for determining a trailer brake magnitude for a trailer brake system of a trailer being towed by a vehicle includes determining connection of a trailer to a vehicle, determining at least one trailer parameter relating to a size, shape or a weight of the trailer, and determining a trailer braking magnitude as a function of the at least one trailer parameter.

18 Claims, 4 Drawing Sheets

TRAILER BRAKE CONTROL

FIELD

The present disclosure relates to estimating at least one trailer parameter for control of a trailer brake.

BACKGROUND

A vehicle must use additional energy to tow and to stop when towing a trailer. Some trailers include a trailer brake that has an adjustable braking magnitude that can be manually set by a user. However, a user can set an incorrect braking magnitude and this can affect the vehicle braking system as well as the stability of the vehicle during decelerations.

SUMMARY

In at least some implementations, a method for determining a trailer brake magnitude for a trailer brake system of a trailer being towed by a vehicle includes determining connection of a trailer to a vehicle, determining at least one trailer parameter relating to a size, shape or a weight of the trailer, and determining a trailer braking magnitude as a function of the at least one trailer parameter.

In at least some implementations, the at least one trailer parameter includes an estimated weight of the trailer, and the estimated weight of the trailer is determined by a load sensor of the vehicle. In at least some implementations, the load sensor is a ride height sensor of a vehicle suspension system. In at least some implementations, the load sensor is an inflated member located in the connection area between the vehicle and trailer. In at least some implementations, the estimated weight of the trailer is determined as a function of a pressure of the inflated member and a location of an axle of the trailer relative to the vehicle.

In at least some implementations, the at least one trailer parameter includes an estimated weight of the trailer, and the estimated weight of the trailer is determined by comparison of at least one vehicle acceleration when the trailer is determined to be connected to the vehicle with the at least one vehicle acceleration when the trailer is not connected to the vehicle. In at least some implementations, the method includes determining a weight of at least some things within the vehicle to enable determination of a weight of the vehicle including the things within the vehicle.

In at least some implementations, the at least one trailer parameter includes a length between a front end and a rear end of the trailer. In at least some implementations, the at least one trailer parameter includes a location of an axle of the trailer.

In at least some implementations, the method includes controlling the trailer brake system as a function of the determined trailer brake magnitude. In at least some implementations, the trailer brake magnitude is adjusted based on at least one road condition. In at least some implementations, the at least one road condition includes one or more of a road surface type, an environmental condition that affects vehicle traction, and a slope of a portion of a road being traveled on by the vehicle.

In at least some implementations, the method includes providing a notice of the determined trailer brake magnitude.

In at least some implementations, a system for determining a trailer brake magnitude for a trailer being towed by a vehicle includes one or more sensors that provide an output from which a weight of a trailer can be estimated, a control system communicated with the one or more sensors, and responsive to the output provided from the one or more sensors to determine a trailer brake magnitude, and a trailer brake actuator associated with a trailer brake system. The trailer brake actuator is operable to apply a trailer brake of the trailer brake system, and the trailer brake actuator is driven by the control system.

In at least some implementations, the one or more sensors includes a load sensor that is part of a suspension system of the vehicle and includes one or both of a ride height sensor and a ride height adjustment device.

In at least some implementations, the one or more sensors includes a trailer size sensor that is a camera or a reflective sensor, and wherein the controller is connected with the trailer size sensor and the trailer brake magnitude is determined as a function of the output of the trailer size sensor.

In at least some implementations, the one or more sensors is associated with an inflated member located in the connection area between the vehicle and trailer, and wherein the estimated weight of the trailer is determined as a function of a pressure of the inflated member.

In at least some implementations, the one or more sensors includes a trailer size sensor and wherein the estimated weight of the trailer is determined as a function of the output of the trailer size sensor. In at least some implementations, the estimated weight of the trailer is determined at least in part as a function of a length of the trailer as determined from an output of the trailer size sensor, and the length of the trailer is a distance between a front end and a rear end of the trailer.

In at least some implementations, the output from the trailer size sensor enables determination of a location of an axle of the trailer relative to the vehicle.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
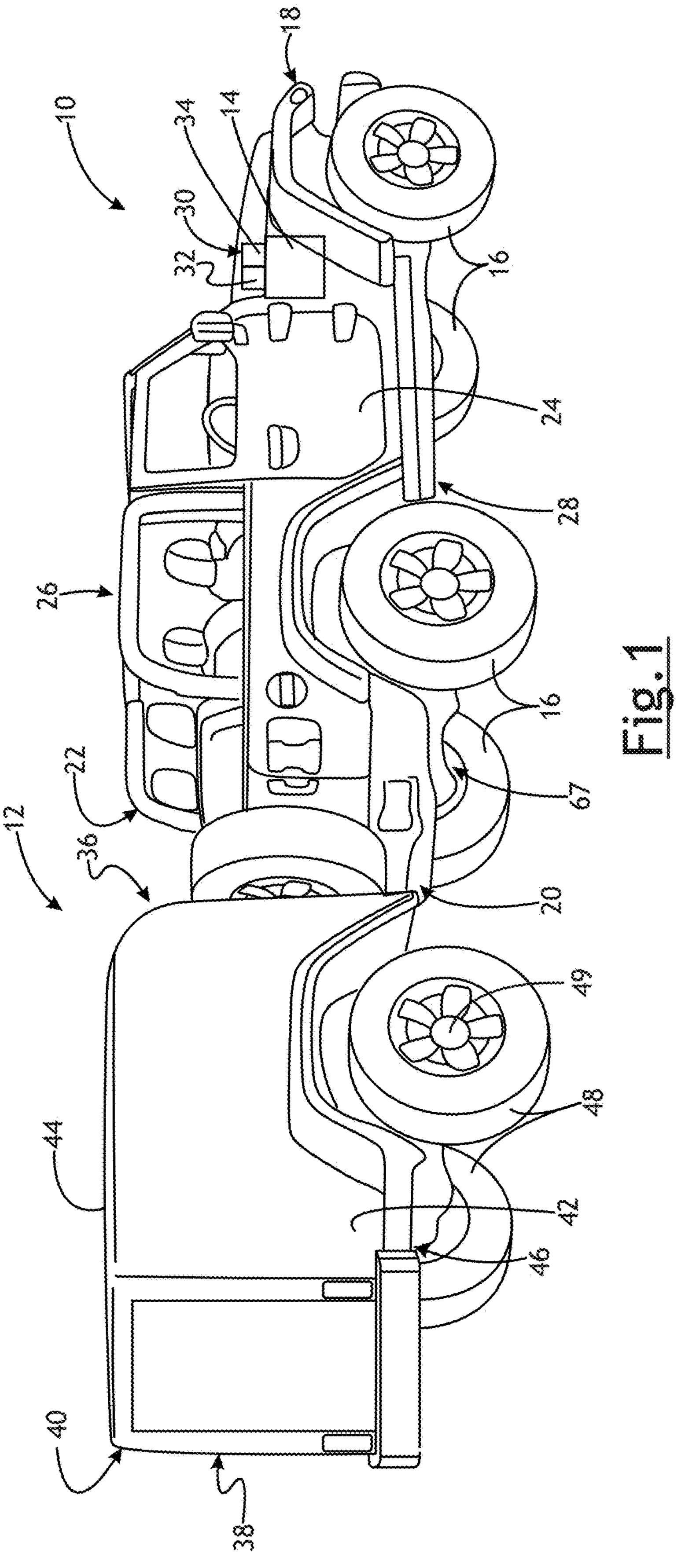
FIG. 1 is a perspective view of a vehicle with a trailer connected to the vehicle.

Referring in more detail to the drawings, FIG. 1 illustrates a vehicle 10 that is connected to a trailer 12. The vehicle 10 includes a prime mover 14 such as a combustion engine, an electric motor or both as in a hybrid vehicle 10. The prime mover 14 is coupled to the vehicle wheels 16 to drive the vehicle 10. The vehicle 10 has a front end 18 spaced from a rear end 20 in a fore-aft direction, left and right sides 22, 24 spaced apart in a cross-car direction and top and bottom sides 26, 28 spaced apart in a vertical direction. The vehicle 10 also includes a control system 30 that has one or more processors 32 and memory 34 including instructions for various functions carried out by the control system 30, including but not limited to those set forth herein.

Figure 2:
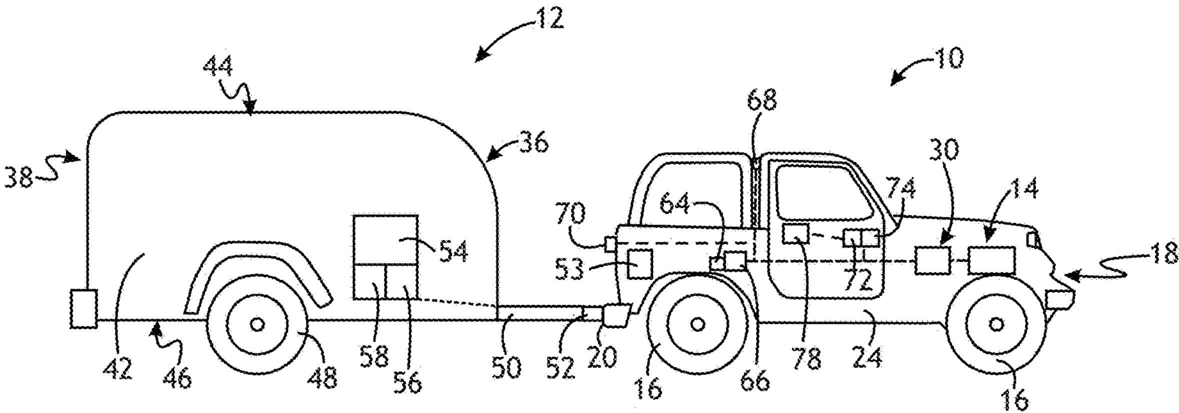
FIG. 2 is a side view of the vehicle and trailer.

The trailer 12 likewise includes a front end 36 and a rear end 38 spaced apart in the fore-aft direction, left and right sides 40, 42 spaced apart in the cross-car direction and top and bottom sides 44, 46 spaced apart in the vertical direction. Trailer wheels 48 are provided adjacent to the left and right sides 40, 42 of the trailer 12, and between the front and rear ends 36, 38 of the trailer 12 and are carried on a trailer axle 49. As shown in FIG. 2, a tongue 50 of the trailer 12 extends from the front end 36 of the trailer 12 and is connectable to a hitch 52 of the vehicle 10 that is located at the rear end 20 of the vehicle 10. In this way, the front end 36 of the trailer 12 is adjacent to the rear end 20 of the vehicle 10, and the trailer 12 is pulled behind the vehicle 10 when the vehicle 10 moves forward.

When the trailer 12 is connected to the vehicle 10, it can take more energy to move, and to slow and stop, the combination of the trailer 12 and vehicle 10 than it does for the vehicle 10 alone. The extra energy is needed due, for example, to the extra weight of the trailer 12. To enable controlled speed reduction and stopping the vehicle and trailer, the vehicle 10 includes a first brake system 53 associated with the vehicle wheels 16, and the trailer 12 includes a second brake system 54 associated with one or more wheels 48 of the trailer 12. The vehicle brake system 53 and trailer brake system 54 may be of any suitable type, such as disc or drum brakes.

The trailer brake system 54 may be electrically actuated and the control system 30 may control both the vehicle brake system 53 and the trailer brake system 54. For example, the trailer brake system 54 may include a trailer brake controller 56 that is coupled to the control system 30. The connection may be made, for example, via a wired connection in the area of the tongue 50/hitch 52 so that the control system 30 can, via the trailer brake controller 56 drive a trailer brake actuator 58 which moves or causes the friction brake component (e.g. brake pads or shoes) of the trailer brake system 54 to move. The trailer brake controller 56 may be considered to be part of the control system 30.

Some vehicles include a user interface that permits a user to set a level or magnitude of trailer brake response, that is, the force applied in the trailer brake system 54 during a braking event. For example, the levels may be adjusted in a defined range of low, medium and high, with high having a maximum braking magnitude and low having the least braking magnitude (e.g. medium and high provide a gain or increased braking magnitude compared to low, and high has the greatest gain). In at least some implementations, the magnitude of the braking gain or control may be controlled by use of a pulse width modulated or other variable actuating signal provided from the control system 30 to the trailer brake system 54.

The level or magnitude is set by the user as a function of a known weight of the trailer or an estimation of the trailer weight made by the user. The trailer weight varies as a function of the load within or otherwise carried by the trailer, and the weight may vary over time as things are loaded into and removed from the trailer. A user must then continually update the trailer brake adjustment, and failure to do so results in over or under-braking. In an example, if the trailer brake setting is too high, the trailer brake may unduly apply the trailer brake to the trailer wheels, and can cause the trailer wheels to lock-up and skid, which can cause the trailer to jack knife and cause instability in the vehicle path of travel. Conversely, if the trailer brake is too low, the vehicle stopping distance is affected and the vehicle brakes can be overused and the friction components can become overheated which reduces their effectiveness and their effective life.

In at least some implementations, the control system 30 estimates one or more trailer parameters to enable the control system 30 to apply, or to recommend to a user, a trailer brake magnitude as a function of the current/instantaneous trailer conditions. For example, the trailer parameters may include one or more of the trailer weight, the trailer size (e.g. height, width, length) and the location of a trailer axle 49 (e.g. distance from the vehicle 10). The trailer parameters can be used to determine or estimate the trailer weight, and other factors such as aerodynamic drag of the trailer (which may aid braking/speed reduction). From this determination/estimation, the system may automatically apply a recommended or determined trailer brake magnitude or the system may provide a recommendation to a user to enable the user to select an appropriate trailer brake magnitude/setting.

Various sensors may be used individually or collectively to determine the trailer parameter(s). For example, and with reference to FIG. 2, the vehicle 10 or trailer 12 may include one or more load sensors 64 that are adapted to detect a load of a trailer 12 connected to a vehicle 10 and provide a load sensor output to the control system 30 that is indicative of the trailer weight and/or trailer load on the vehicle 10, where the load may be different based on the weight distribution in the trailer, location of a trailer axle 49, and other factors. The load sensor 64 may be a force or mass sensor associated with the vehicle hitch 52 and having an output that is indicative of the force of the trailer 12 on the hitch 52. For example, a damping component may be provided between the hitch 52 and tongue 50, such as an inflated member or component called an air bag 60, to damp vibrations and provide a smoother force transmission between the vehicle 10 and trailer 12. A pressure of the air bag 60 may be vary as a function of the load applied to it by the trailer tongue 50, and that pressure may be used to estimate trailer weight.

In addition or instead, the load sensor 64 may be associated with a vehicle ride height system 66 that includes a ride height adjustment device, such as a suspension component having a pressurized fluid (hydraulic or pneumatic) the pressure of which can be changed to alter the vehicle 10 ride height. For example, increased load in or on the vehicle 10 can cause the vehicle suspension to permit vehicle 10 travel toward the ground, reducing ride height (e.g. clearance between the vehicle and the ground). The pressure of the suspension component fluid may be increased to raise the vehicle body relative to the ground, and the pressure required to achieve a desired ride height is a function of the load on the vehicle 10 and can be used by the control system 30 to estimate the vehicle load, where the addition of the trailer 12 increases the load on the vehicle 10. Of course, ride height adjustment systems 66 may use actuators other than pressurized fluid components, such as those driven by electric motors or other electromechanical systems. In at least some implementations, a movement or other change in the suspension system 67 (FIG. 1) can be correlated to a load of the trailer 12. This may be done as a function of one or both of the magnitude of a change in the vehicle ride height and/or a force from the ride height adjustment device needed to increase the ride height.

Additionally or instead, the load of the trailer 12 may be estimated by the impact the trailer 12 has on vehicle performance compared to, for example, the vehicle performance without the trailer 12 being towed by the vehicle 10. For example, the acceleration of the combined vehicle 10 and trailer 12 can be compared to the acceleration of the vehicle 10 by itself, which may be determined by the manufacturer or otherwise or determined during use of the vehicle 10 when the size sensors or other trailer sensors determine that no trailer 12 is being towed. Accelerations, both increasing and decreasing speed (e.g. deceleration), as well as lateral accelerations while the vehicle 10 is turning, can be affected by the trailer 12 and the differences from the base/unloaded vehicle accelerations can be determined and used to estimate the trailer load. Additionally or instead, fuel or other energy consumption rates (e.g. fuel injector flow rates, motor current draw, etc) can be determined both when the vehicle is operated with and without a trailer, and from this information, the trailer load can be estimated.

Further, vehicle weight is affected by things within the vehicle, such as cargo and people. The vehicle load sensors may be used to determine a vehicle weight at any given time. Or, to determine vehicle weight cause by things within the vehicle, one or more interior cameras or other interior vision/object sensors 62 (such sensors are described in more detail below with regard to exterior sensors) may be used to detect things within the vehicle 12 and enable an estimate of the weight of such things which can be combined with a nominal/base weight of the unloaded vehicle (which may be known before use of the vehicle). For example, object recognition techniques can be used to determine the type of objects and/or relative size of objects or people in the vehicle. From that information the weight of the objects or people can be estimated. The weight of interior things can be considered in the analysis of vehicle performance so that this weight is not attributed to the trailer 12.

Figure 3:
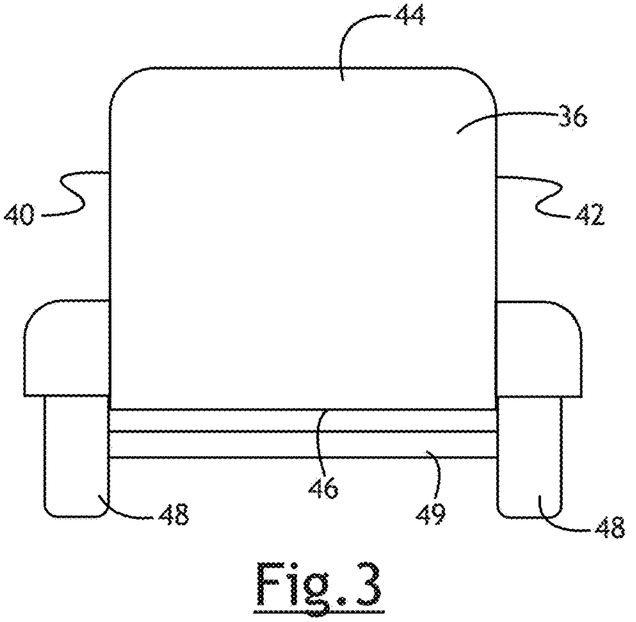
FIG. 3 is a diagrammatic view of the front end of the trailer.

By way of another example, the vehicle 10 may include one or more sensors adapted to detect at least one parameter related to the size of the trailer 12 and provide an output indicative of the size parameter. In one example, the area of the front end 36 of the trailer 12 (e.g. cross-car width between sides 40, 42 times vertical height between the top 44 and bottom 46, diagrammatically shown in FIG. 3) is determined or estimated because this area is relevant to the amount of increased air resistance or drag caused by the trailer 12, where increased drag requires increased energy to move the vehicle 10 and trailer 12. One or more sensors may determine a location of a trailer axle 49 as the trailer axle 49 acts as a fulcrum for the trailer load and the distance of the trailer axle 49 from the vehicle can be used to help determine the trailer weight.

In one example, the area of the front end 36 of the trailer 12 is determined by one or more cameras 68 on the vehicle 10 and having a field of view that includes an area behind the rear end 20 of the vehicle 10. Such cameras 68 are common in modern vehicles to provide a video feed to a display screen in the vehicle 10 when the vehicle 10 is in reverse gear or reverse drive mode to improve driver visibility of the area behind the vehicle 10. The cameras 68 could also or instead be used for digital rear-view mirrors, lane identification or lane keeping assist systems, Advanced Driver Assist Systems (ADAS, e.g. autonomous or semi-autonomous driving systems), or to detect objects behind the vehicle 10 even when the vehicle 10 is not in reverse. Further, with object recognition techniques, the type or model of trailer may be determinable from one or more images from one or more cameras 68. The system could then determine the trailer dimensions and other information, such as axle location, as desired, from online sources.

In addition to or instead of one or more cameras 68, the vehicle 10 may include at least one reflective sensor 70 that emits waves (e.g. light or sound or electromagnetic or ultrasonic) and that receives reflected waves to determine the presence of objects in the path of the emissions, and may also determine the distance to the objects and the object size and shape (e.g. size and shape of surfaces that reflect waves back toward the sensor). For example, sonar or radar or LIDAR sensors may be used to provide information for ADAS and other vehicle 10 systems, like blind spot monitoring systems. The output(s) from such sensors 70 may be communicated with the control system 30 which may include instructions to determine from the output(s) a size of at least the front end 36 of the trailer 12. The front end 36 of the trailer 12 can be a significant source of drag and this can be estimated as a function of the area of at least part of the front end 36 of the trailer 12, and this can be used in the determination of an appropriate trailer braking force.

The cameras 68 and/or sensors 70, which may collectively be called trailer size sensors, may also be used by existing vehicle 10 systems such as a trailer reverse steering control system 72 that controls at least part of a vehicle steering assembly 74 when the vehicle 10 is operated in reverse. Such systems 72 facilitate reverse operation of the vehicle 10 and trailer 12 which can be tricky to do accurately in view of the pivoted connection of the trailer 12 and vehicle 10. These systems may determine a length of the trailer 12 between the front end 36 and the rear end 38 (and the width between the left and right sides 40, 42) to improve and facilitate control of the vehicle 10 and trailer 12. Similarly, the cameras 68 and/or sensors 70 may be used in a blind spot monitoring system 78 that may determine the location of opposite sides 40, 42 of the trailer 12 and the length of the trailer 12. The blind spot monitoring system 78 may then detect objects next to or approaching the sides of the trailer 12 and provide an alert to a driver of the vehicle 10 when an object is detected adjacent to one of the opposite sides 40, 42 of the trailer 12.

While one or the other of a load sensor 64 and a size sensor 68, 70 may be used, in at least some implementations a system for determining one or more trailer parameters includes both a load sensor 64 and a trailer size sensor 68, 70. The load sensor 64 and trailer size sensor(s) 68, 70 provide outputs to the control system 30 which is responsive to the load sensor output and the trailer size sensor output(s) to estimate the size and load of a trailer and the combination of the vehicle 10 and trailer 12.

Figure 4:
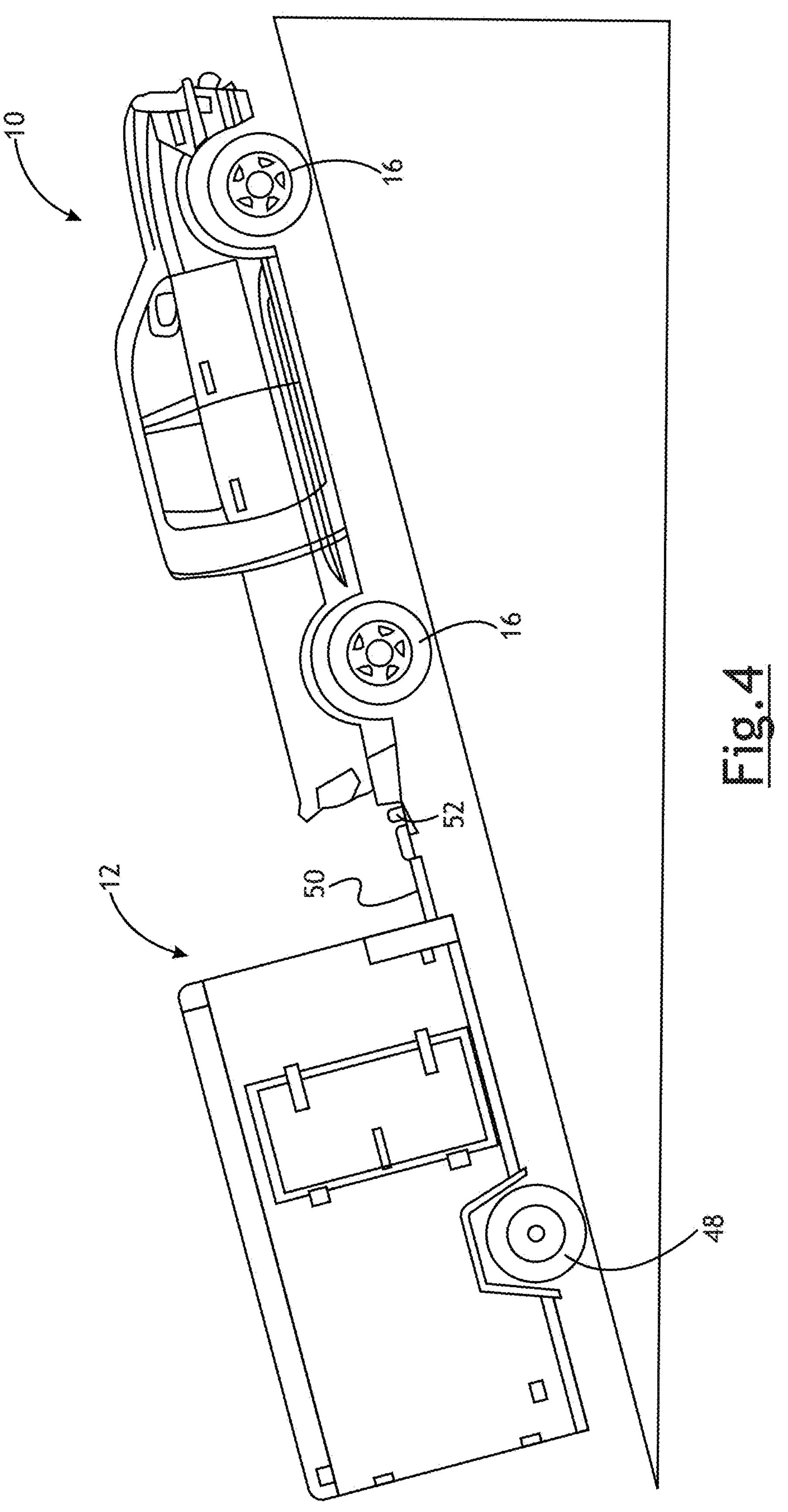
FIG. 4 is a side view of a vehicle and trailer traveling on an incline.

In at least some implementations, the system may determine one or more road conditions to aid in controlling the trailer brake system 54. Example road conditions include, the road surface type (e.g. paved or not), the slope or grade of the road, and environmental conditions that affect traction, such as whether the road is wet or icy. This information may be obtained from, by way of non-limiting examples, the vision/object/size sensors (which may enable detection of road surface types), weather information sources (which may provide information about rain or icy conditions including ambient temperature in the area of the vehicle 10, and assist in determining a friction coefficient for the road being traveled), and map data (which may provide information about road slope, surface type, location, etc). Higher traction conditions and inclined roads, such as is shown in FIG. 4, may permit greater vehicle braking and may permit greater trailer brake magnitude, while lower traction conditions and declined roads may permit lower vehicle braking and lower trailer brake magnitude to be applied to avoid over-braking the trailer and potential causing the trailer wheels to skid, for example, which can negatively affect vehicle stability.

Figure 5:
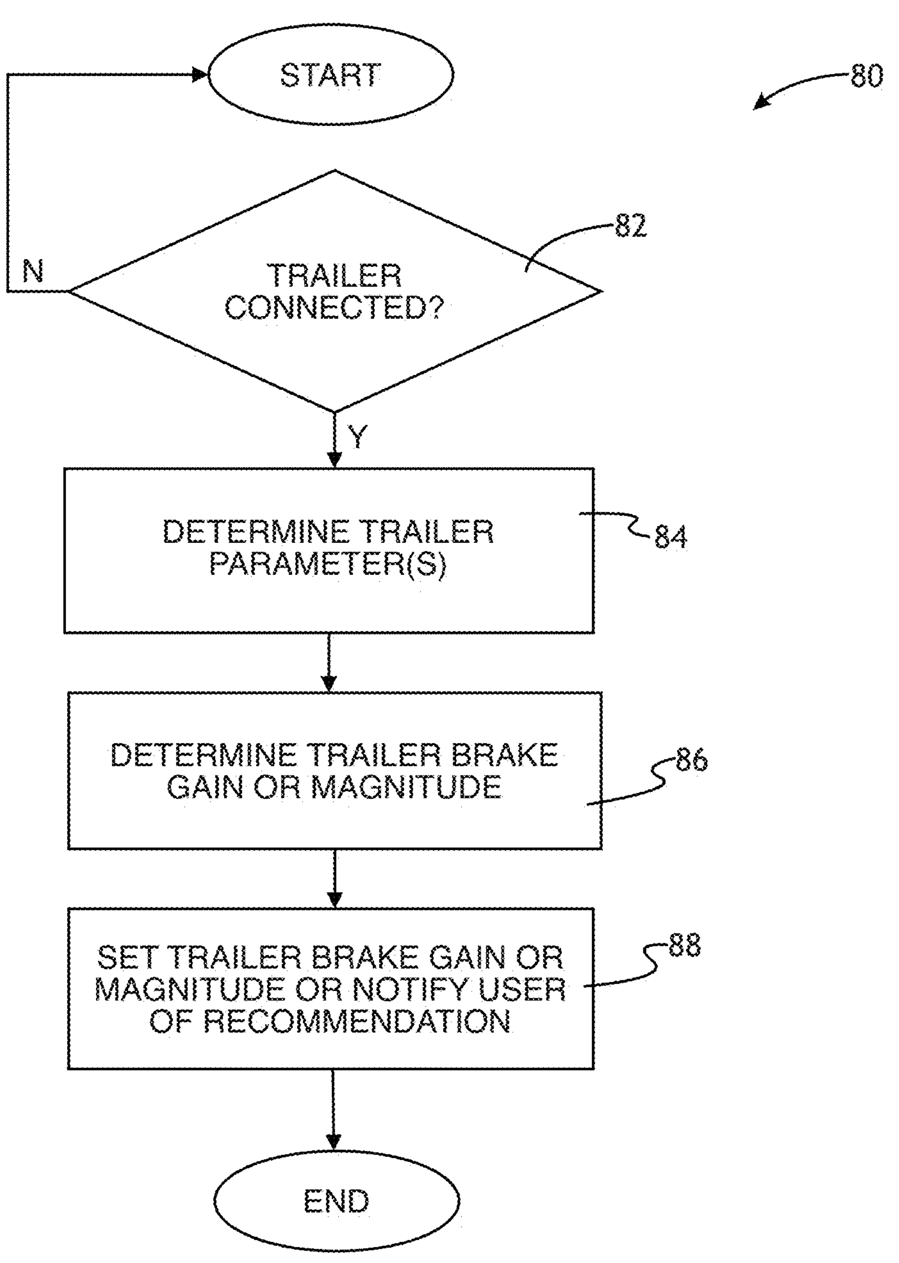
FIG. 5 is a flowchart of a method of estimating one or more parameters of a trailer.

FIG. 5 is a flowchart of a method 80 for controlling a trailer brake system 54 for a trailer 12 connected to a vehicle 10. In step 82, connection of a trailer 12 to the vehicle 10 is determined or detected. This may be done automatically by interpretation of output from the camera(s) 68 or other sensor(s) 70 by which presence of a trailer 12 behind the vehicle 10 can be determined, as noted above. This may also or instead by done in response to output from the load sensor(s) 64, such as a change in ride height of a stationary vehicle 10 indicating a load applied to the vehicle 10. This may also or instead be done by determination that an electrical connector of the trailer 12 is connected to an electrical connector of the vehicle 10, such as to power taillights on the trailer 12. Such electrical connections are commonly made in the area of the vehicle 10 hitch 52. Further, this may be done by a user inputting the trailer connection into a program interface via the vehicle 10 infotainment system or an application on a mobile device.

After connection of a trailer 12 to the vehicle 10 is determined, the method continues to step 84 in which at least one trailer parameter relating to a size, shape or a weight of the trailer 12 is determined, as set forth above. Thereafter, in step 86, a recommended trailer brake gain or magnitude, which may be a range of values if desired, is determined as a function of the at least one trailer 12 parameter, and/or other parameters affecting braking as noted herein. In step 88, the trailer brake magnitude may be automatically set by the control system 30, which may be particularly helpful in semi or fully autonomous driving scenarios, or notice of the recommended trailer brake magnitude may be provided to a user to permit the user to select an appropriate trailer brake magnitude via a user interface. As described above, the method may also include determining at least one road condition and/or a vehicle weight, and determining the trailer brake magnitude as a function of thereof.

The systems and methods set forth herein enable improved control of a trailer brake system 54 and/or a vehicle brake system 53 when the vehicle 10 is pulling a trailer 12. With an appropriate trailer brake setting, situations in which too little or too much trailer braking is provided can be prevented or lessened. When too little trailer braking is provided, the vehicle brakes then need to provide additional braking force which can affect the effectiveness and the useful life of components in the vehicle braking system. When too much trailer braking force is provided, vehicle drive stability and control can be affected, particularly if the trailer wheels skid rather than roll along the ground. This can cause the trailer to veer offline relative to the vehicle and can thereby move a rear of the vehicle offline or otherwise apply forces to the vehicle that affect vehicle control and stability. The system can enable accurate trailer braking magnitude during changing conditions, such as changing trailer load, changing vehicle load, and changing road conditions. The system can detect whether a trailer is connected to the vehicle or not, as well as vehicle, trailer and road conditions, instead of relying on user estimations of a desired trailer brake setting or magnitude.

What is claimed is:

1. A method for determining a trailer brake magnitude for a trailer brake system of a trailer being towed by a vehicle, comprising:

determining connection of a trailer to a vehicle;

determining at least one trailer parameter relating to a size, shape or a weight of the trailer;

determining a weight of at least some things within the vehicle to enable determination of a weight of the vehicle including the things within the vehicle;

determining a trailer braking magnitude as a function of the at least one trailer parameter and the weight of the vehicle including the things within the vehicle; and controlling the trailer brake system as a function of the determined trailer brake magnitude.

2. The method of claim 1 wherein the at least one trailer parameter includes an estimated weight of the trailer, and the estimated weight of the trailer is determined by a load sensor of the vehicle.

3. The method of claim 2 wherein the load sensor is a ride height sensor of a vehicle suspension system.

4. The method of claim 2 wherein the load sensor is an inflated member located in a connection area between the vehicle and the trailer.

5. The method of claim 1 wherein the at least one trailer parameter includes an estimated weight of the trailer, and the estimated weight of the trailer is determined by comparison of at least one vehicle acceleration when the trailer is determined to be connected to the vehicle with at least one vehicle acceleration when the trailer is not connected to the vehicle.

6. The method of claim 1 wherein the at least one trailer parameter includes a length between a front end and a rear end of the trailer.

7. The method of claim 6 wherein the at least one trailer parameter includes a location of an axle of the trailer.

8. The method of claim 1 wherein the trailer brake magnitude is adjusted based on at least one road condition.

9. The method of claim 8 wherein the at least one road condition includes one or more of a road surface type, an environmental condition that affects vehicle traction, and a slope of a portion of a road being traveled on by the vehicle.

10. The method of claim 1 wherein the step of determining a weight of at least some things within the vehicle is accomplished with a load sensor of the vehicle, and wherein the load sensor is a ride height sensor of a vehicle suspension system, or wherein the step of determining a weight of at least some things within the vehicle is accomplished with one or more cameras or object sensors arranged to detect things within the vehicle.

11. A method for determining a trailer brake magnitude for a trailer brake system of a trailer being towed by a vehicle, comprising:

determining connection of a trailer to a vehicle;

determining at least one trailer parameter relating to a size, shape or a weight of the trailer;

determining a trailer braking magnitude as a function of the at least one trailer parameter; and controlling the trailer brake system as a function of the determined trailer brake magnitude, wherein the at least one trailer parameter includes an estimated weight of the trailer, and the estimated weight of the trailer is determined by a load sensor of the vehicle, the load sensor is an inflated member located in a connection area between the vehicle and the trailer, and wherein the estimated weight of the trailer is determined as a function of a pressure of the inflated member and a location of an axle of the trailer relative to the vehicle.

12. A system for determining a trailer brake magnitude for a trailer being towed by a vehicle, comprising:

one or more sensors that provide an output from which a weight of a trailer can be estimated;

a control system communicated with the one or more sensors, and responsive to the output provided from the one or more sensors to determine a trailer brake magnitude as a function of the weight of the trailer; and a trailer brake actuator associated with a trailer brake system and operable to apply a trailer brake of the trailer brake system, the trailer brake actuator being driven by the control system as a function of the determined trailer brake magnitude, wherein a) the weight of the trailer is estimated by a load sensor of the vehicle, the load sensor is an inflated member located in a connection area between the vehicle and the trailer, and the estimated weight of the trailer is determined as a function of a pressure of the inflated member and a location of an axle of the trailer relative to the vehicle, or b) one or more sensors are provided that provide an output from which a weight of at least some things within the vehicle can be determined, and the trailer brake magnitude is determined as a function of the weight of the at least some things within the vehicle, or both a) and b).

13. The system of claim 12 wherein the one or more sensors that provide an output from which a weight of a trailer can be estimated includes a load sensor that is part of a suspension system of the vehicle and includes one or both of a ride height sensor and a ride height adjustment device.

14. The system of claim 12 wherein the one or more sensors that provide an output from which a weight of a trailer can be estimated includes a trailer size sensor that is a camera or a reflective sensor, and wherein the control system is connected with the trailer size sensor and the trailer brake magnitude is determined as a function of the output of the trailer size sensor.

15. The system of claim 12 wherein the one or more sensors that provide an output from which a weight of a trailer can be estimated includes a trailer size sensor and wherein the estimated weight of the trailer is determined as a function of the output of the trailer size sensor.

16. The system of claim 15 wherein the estimated weight of the trailer is determined at least in part as a function of a length of the trailer as determined from an output of the trailer size sensor, and the length of the trailer is a distance between a front end and a rear end of the trailer.

17. The system of claim 16 wherein the output from the trailer size sensor enables determination of a location of an axle of the trailer relative to the vehicle.

18. The system of claim 12 wherein the one or more sensors that provide an output from which a weight of at least some things within the vehicle can be determined include one or more load sensors of the vehicle.

* * * * *